(12) United States Patent
Wisniowski et al.

(10) Patent No.: US 10,699,142 B2
(45) Date of Patent: Jun. 30, 2020

(54) SYSTEMS AND METHODS FOR TRAFFIC SIGNAL LIGHT DETECTION

(71) Applicant: GM GLOBAL TECHNOLOGY OPERATIONS LLC, Detroit, MI (US)

(72) Inventors: Matthias Wisniowski, San Francisco, CA (US); Stuart Glaser, San Francisco, CA (US); Gautier Minster, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 176 days.

(21) Appl. No.: 15/492,669

(22) Filed: Apr. 20, 2017

(65) Prior Publication Data

US 2018/0307925 A1 Oct. 25, 2018

(51) Int. Cl.
| | |
|---|---|
| *G06K 9/00* | (2006.01) |
| *G08G 1/0967* | (2006.01) |
| *G06T 7/73* | (2017.01) |
| *G06K 9/62* | (2006.01) |
| *G06K 9/46* | (2006.01) |
| *G08G 1/0968* | (2006.01) |
| *G08G 1/0962* | (2006.01) |
| *G08G 1/095* | (2006.01) |

(52) U.S. Cl.
CPC ....... *G06K 9/00825* (2013.01); *G06K 9/4628* (2013.01); *G06K 9/6271* (2013.01); *G06T 7/73* (2017.01); *G08G 1/09623* (2013.01); *G08G 1/096725* (2013.01); *G08G 1/096791* (2013.01); *G08G 1/096844* (2013.01); *G06T 2207/10024* (2013.01); *G06T 2207/20081* (2013.01); *G06T 2207/20084* (2013.01); *G06T 2207/30252* (2013.01); *G08G 1/095* (2013.01)

(58) Field of Classification Search
CPC ............ G06K 9/00825; G06K 9/6271; G06K 9/4628; G08G 1/095; G08G 1/096725; G08G 1/096791; G05D 1/0088; G05D 1/0248; G05D 1/0257; G06T 7/73; G06T 2207/10024; G06T 2207/20081; G06T 2207/30252
See application file for complete search history.

(56) References Cited

U.S. PATENT DOCUMENTS

| | | | | |
|---|---|---|---|---|
| 2010/0100268 | A1* | 4/2010 | Zhang | B60W 30/09 701/25 |
| 2015/0179088 | A1* | 6/2015 | Raman | H04W 4/026 348/62 |
| 2015/0356357 | A1* | 12/2015 | McManus | G06K 9/00791 382/104 |
| 2018/0365532 | A1* | 12/2018 | Molchanov | G06K 9/4628 |

OTHER PUBLICATIONS

Szegedy et al. ( "Deep neural networks for object detection.", Advances in neural information processing systems. 2013). (Year: 2013).*

* cited by examiner

*Primary Examiner* — Pinalben Patel
(74) *Attorney, Agent, or Firm* — Lorenz & Kopf LLP (57) ABSTRACT

Systems and methods are provided for analyzing traffic signal lights in order to control an autonomous vehicle. A method includes receiving an image from a camera regarding at least one traffic signal light and receiving data related to the traffic signal light. Neural networks determine location and characteristics of the traffic signal light.

20 Claims, 9 Drawing Sheets

SYSTEMS AND METHODS FOR TRAFFIC SIGNAL LIGHT DETECTION

TECHNICAL FIELD

The present disclosure generally relates to autonomous vehicles, and more particularly relates to systems and methods for traffic signal light detection in an autonomous vehicle.

INTRODUCTION

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Some autonomous vehicles can include systems that detect a traffic signal light within the driving environment. In these systems, computer vision segmentation approaches place traffic signal lights in three-dimensional coordinate landscapes for use in detection. This approach to traffic signal light detection is computationally intensive and expensive, which makes it slow and very time consuming within an autonomous vehicle environment.

Accordingly, it is desirable to provide systems and methods that can speed up the process of turn signal detection. Furthermore, other desirable features and characteristics of the present invention will become apparent from the subsequent detailed description and the appended claims, taken in conjunction with the accompanying drawings and the foregoing technical field and background.

SUMMARY

Systems and methods are provided for controlling an autonomous vehicle. In one embodiment, a system and method includes receiving an image from a camera regarding at least one traffic signal light and receiving data related to the traffic signal light. Machine learning models can use this information to determine location and characteristics of the traffic signal light.

In embodiments, a system and method includes analyzing traffic signal lights in order to control an autonomous vehicle. An image from a camera is received, by one or more processors, regarding at least one traffic signal light located within the driving environment of the autonomous vehicle. Data from a lidar device is received, by the one or more processors, related to probable geometry and position of the traffic signal light located within the image. A machine learning model that includes one or more neural networks are applied, using the one or more processors, to the received data and to the camera image for determining location and characteristics of the traffic signal light. The determined characteristics include characterization of the traffic signal light with respect to shape and color in order to determine an indicator type. Control of the autonomous vehicle is based upon the determined location and characteristics of the traffic signal light by the one or more neural networks.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
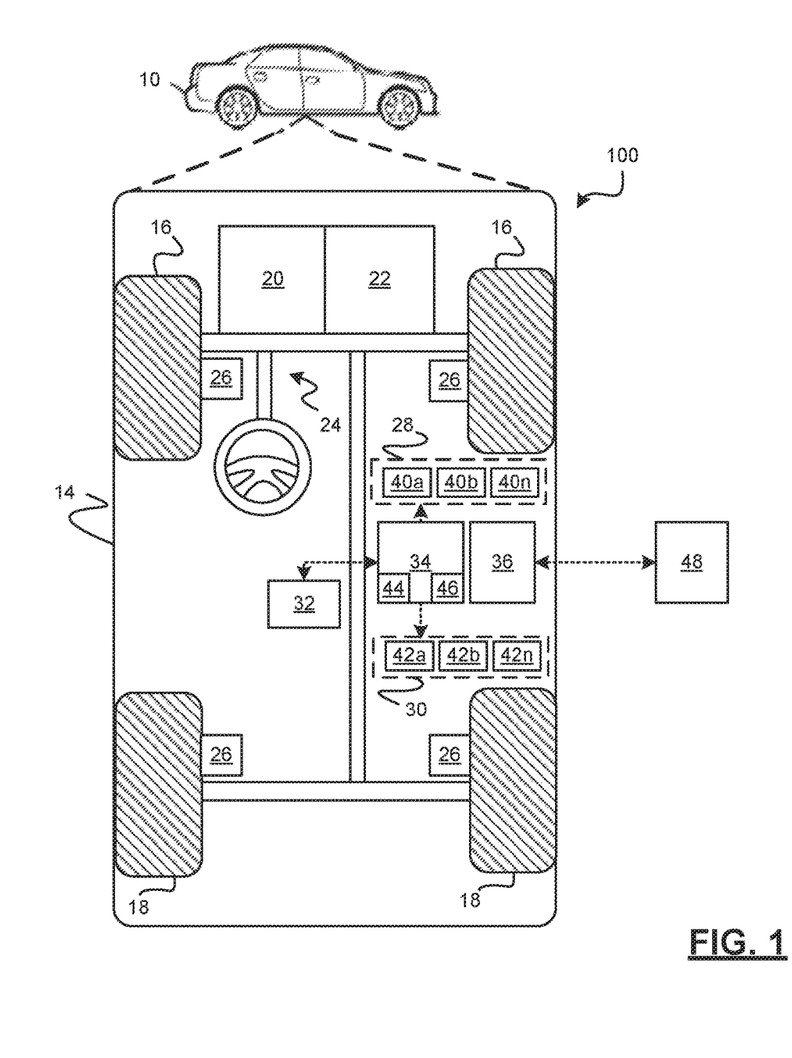
FIG. 1 is a functional block diagram illustrating an autonomous vehicle, in accordance with various embodiments.

With reference to FIG. 1, a system for performing an autonomous vehicle control shown generally as 100 is associated with a vehicle 10 in accordance with various embodiments. In general, the system 100 provides for low level processing of three-dimensional images of surroundings of the vehicle 10, in the form of point clouds, to determine velocity of surrounding objects for use in controlling the vehicle 10.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the system 100, and/or components thereof, are incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, and the like, can also be used.

In an exemplary embodiment, the autonomous vehicle 10 corresponds to a level four or level five automation system under the Society of Automotive Engineers (SAE) "J3016" standard taxonomy of automated driving levels. Using this terminology, a level four system indicates "high automation," referring to a driving mode in which the automated driving system performs all aspects of the dynamic driving task, even if a human driver does not respond appropriately to a request to intervene. A level five system, on the other hand, indicates "full automation," referring to a driving mode in which the automated driving system performs all aspects of the dynamic driving task under all roadway and environmental conditions that can be managed by a human driver. It will be appreciated, however, the embodiments in accordance with the present subject matter are not limited to any particular taxonomy or rubric of automation categories. Furthermore, systems in accordance with the present embodiment may be used in conjunction with any autonomous or other vehicle that utilizes a navigation system and/or other systems to provide route guidance and/or implementation.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n might include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, autonomous vehicle 10 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. Route information may also be stored within data device 32—i.e., a set of road segments (associated geographically with one or more of the defined maps) that together define a route that the user may take to travel from a start location (e.g., the user's current location) to a target location. Also in various embodiments, the data storage device 32 stores processing algorithms and data for processing three-dimensional point clouds to determine velocity of objects in the surroundings on a frame by frame basis. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chip set), any combination thereof, or generally any device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals that are transmitted to the actuator system 30 to automatically control the components of the autonomous vehicle 10 based on the logic, calculations, methods, and/or algorithms. Although only one controller 34 is shown in FIG. 1, embodiments of the autonomous vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10. In one embodiment, as discussed in detail below, controller 34 is configured for use in processing three-dimensional imaging data of surroundings of the vehicle 10 in the form of point clouds to determine velocity on a frame by frame basis for use in autonomous control of the vehicle.

Figure 2:
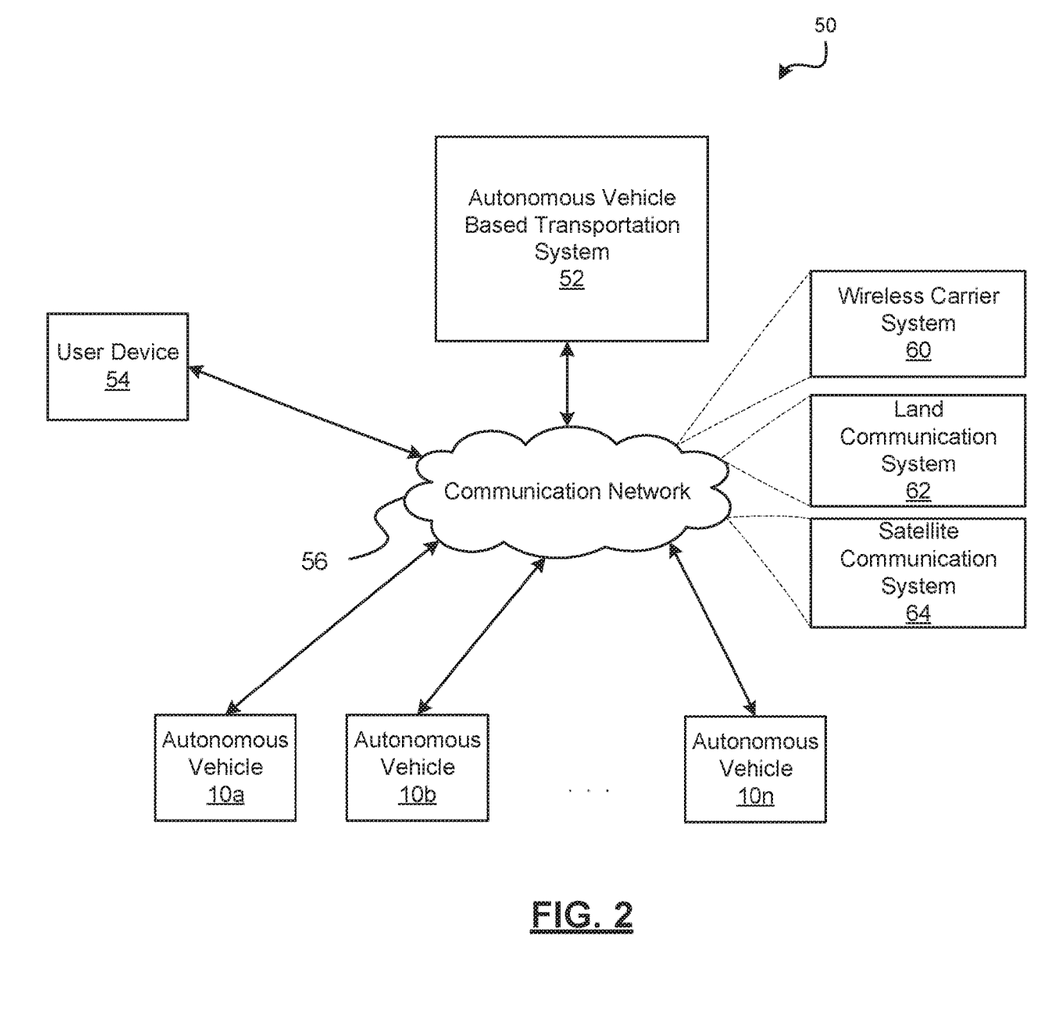
FIG. 2 is a functional block diagram illustrating a transportation system having one or more autonomous vehicles as shown in FIG. 1, in accordance with various embodiments.

The communication system 36 is configured to wirelessly communicate information to and from other entities 48, such as but not limited to, other vehicles ("V2V" communication), infrastructure ("V2I" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system (or simply "remote transportation system") 52 that is associated with one or more autonomous vehicles 10a-10n as described with regard to FIG. 1. In various embodiments, the operating environment 50 (all or a part of which may correspond to entities 48 shown in FIG. 1) further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 may include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, and the like) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a component of a home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, not shown), which may be cloud-based, network-based, or resident at the particular campus or geographical location serviced by the remote transportation system 52. The remote transportation system 52 can be manned by a live advisor, an automated advisor, an artificial intelligence system, or a combination thereof. The remote transportation system 52 can communicate with the user devices 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, biometric data, behavioral patterns, and other pertinent subscriber information. In one embodiment, as described in further detail below, remote transportation system 52 includes a route database 53 that stores information relating to navigational system routes, including lane markings for roadways along the various routes, and whether and to what extent particular route segments are impacted by construction zones or other possible hazards or impediments that have been detected by one or more of autonomous vehicles 10a-10n.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
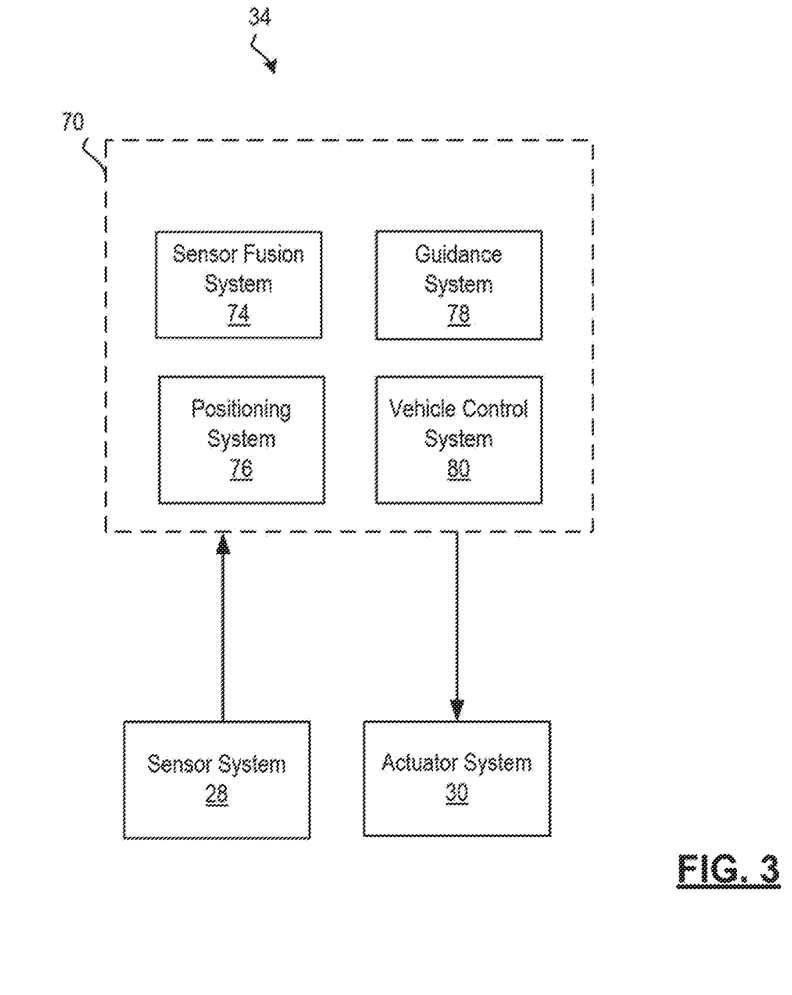
FIG. 3 is functional block diagram illustrating an autonomous driving system (ADS) associated with an autonomous vehicle, in accordance with various embodiments.

In accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10.

In various embodiments, the instructions of the autonomous driving system 70 may be organized by function or system. For example, as shown in FIG. 3, the autonomous driving system 70 can include a sensor fusion system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the sensor fusion system 74 synthesizes and processes sensor data and predicts the presence, location, classification, and/or path of objects and features of the environment of the vehicle 10. In various embodiments, the sensor fusion system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

Figure 4:
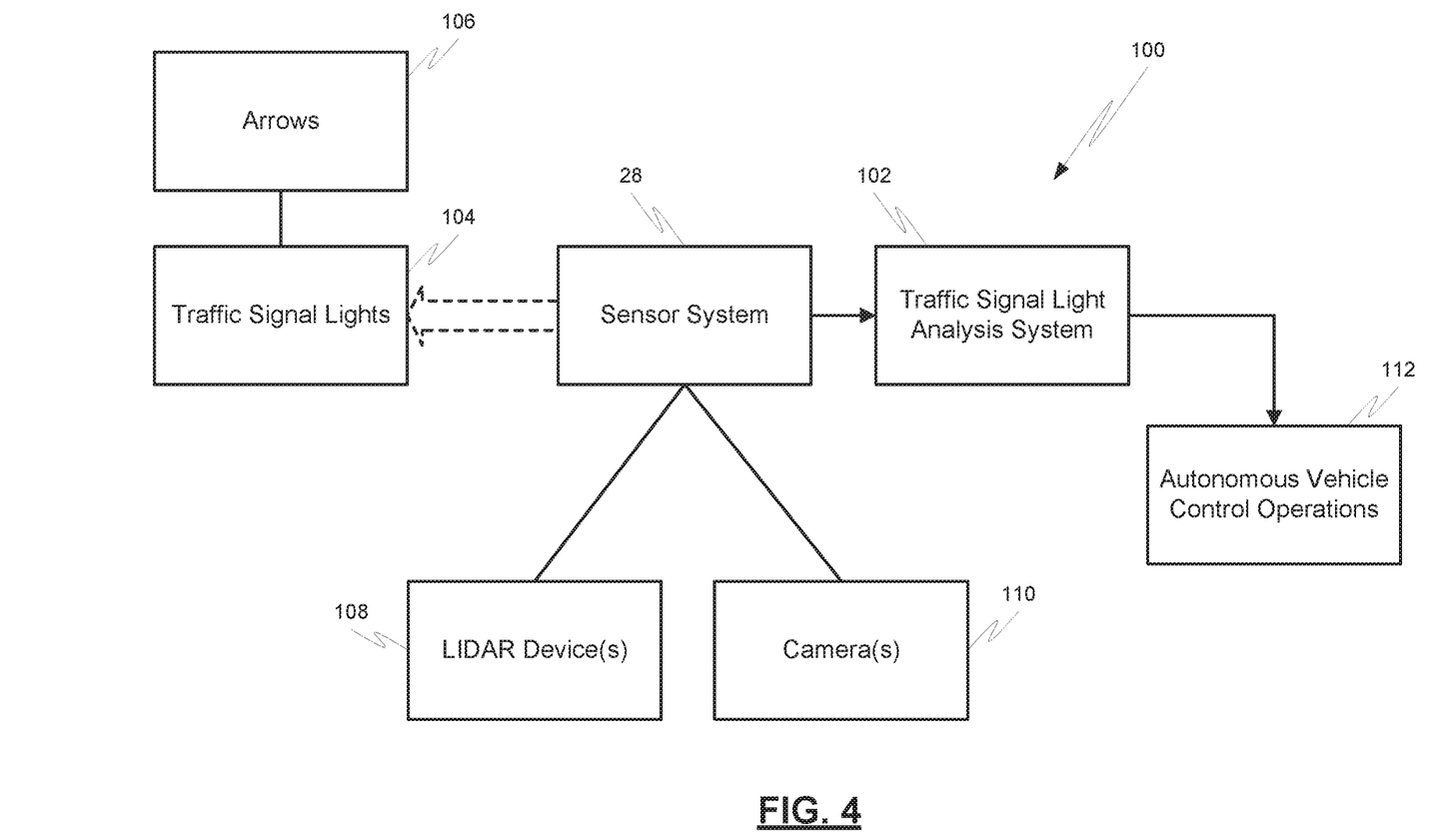
FIG. 4 is a functional block diagram depicting a traffic signal light processing system, in accordance with various embodiments.
Figure 5:
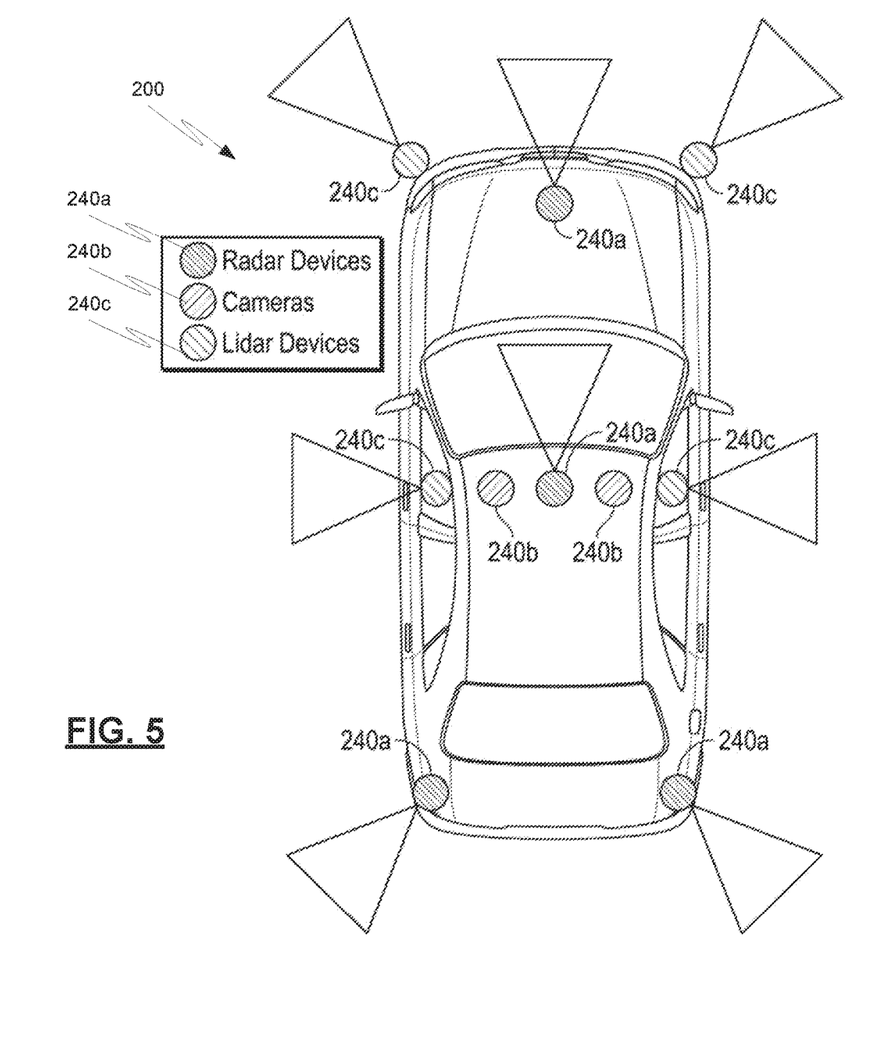
FIG. 5 depicts an exemplary vehicle that includes a plurality of radar devices, cameras, and lidar devices that are distributed about the vehicle in accordance with various embodiments of the present disclosure.

For example, as shown at 100 in more detail with regard to FIG. 4 and with continued reference to FIG. 3, system 102 is configured to detect traffic signal lights 104 within the driving environment as well as determine characteristics of the traffic signal lights 104. Such characteristics can include the traffic signal light's state, shape, color, etc. The system 102 can further determine whether left arrows, right arrows, up arrows, diagonal arrows, etc. 106 of a traffic signal light is in an active state (e.g., signaling a left or right turn for traffic, etc.). The system 102 may also classify lights intended for pedestrians, bicycles and public transport.

The system 102 uses information from the sensor system 28 for detecting the traffic signal lights 104. The sensor system 28 of an autonomous vehicle has a combination of lidar device(s) 108 that provide depth/distance information and camera(s) 110 that capture images of the environment. By calibrating the two types of sensors, lidar device(s) 108 can assign depth to images from the camera(s) 110. In this manner, the system 102 uses lidar device(s) 108 to obtain fine details of object geometry and position in images from camera(s) 110 to localize itself.

The traffic signal light analysis of system 102 can be used by the autonomous vehicle for many purposes including autonomous vehicle tracking control operations 112. This signal behavior analysis improves tracking of other vehicles in proximity to the autonomous vehicle 104. This can include, for example, whether the autonomous vehicle and other vehicles should be stationary or moving based upon the signal states of the traffic lights within the driving environment. Many different types of sensor configurations can be used as shown, for example, in FIG. 6.

Figure 6:
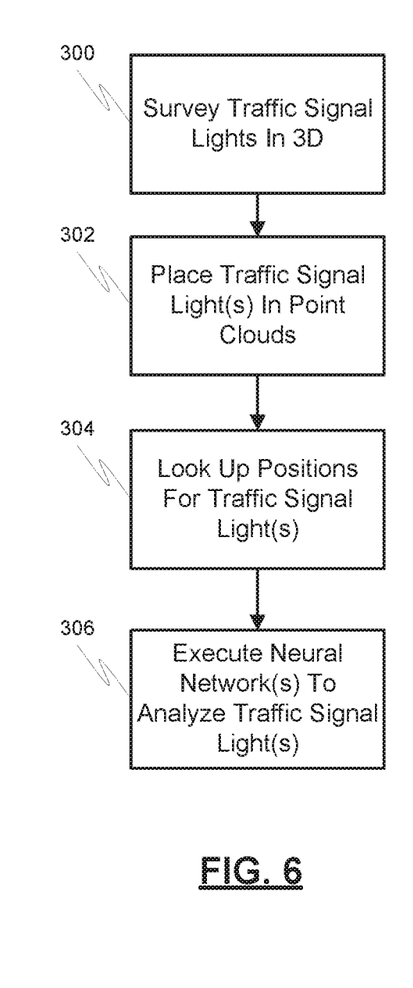
FIG. 6 is a flowchart depicting an operational scenario involving traffic signal light detection.

FIG. 6 depicts an exemplary autonomous vehicle at 200 that includes a plurality of radar devices 240a distributed about the vehicle 200, a plurality of cameras 240b distributed about the vehicle 200 and a plurality of lidar devices 240c distributed about the vehicle 200.

The radar devices 240a are disposed at different locations of the vehicle 200, and in one embodiment, are disposed symmetrically about the longitudinal axis of the vehicle 200 to achieve parallax. Each of the radar devices 240a may include or incorporate components suitably configured to horizontally and rotatably scan the environment to generate radar data that is consumed by other systems.

The cameras 240b are also disposed at different locations and oriented to provide different field of views that capture different portions of the surrounding environment in the vicinity of the vehicle 200. For example, a first camera 240b is positioned at the front left (or driver) side of the vehicle 200 and has its field of view oriented 45° counterclockwise relative to the longitudinal axis of the vehicle 200 in the forward direction, and another camera 240b may be positioned at the front right (or passenger) side of the vehicle 200 and has its field of view oriented 45° clockwise relative to the longitudinal axis of the vehicle 200. Additional cameras 240b are positioned at the rear left and right sides of the vehicle 200 and similarly oriented away from the longitudinal axis at 45° relative to the vehicle longitudinal axis, along with cameras 240b positioned on the left and right sides of the vehicle 200 and oriented away from the longitudinal axis perpendicular to the vehicle longitudinal axis. The illustrated embodiment also includes a pair of cameras 240b positioned at or near the vehicle longitudinal axis and oriented to capture a forward looking field of view along a line of sight substantially parallel to the vehicle longitudinal axis.

In exemplary embodiments, the cameras 240b have angle of views, focal lengths, and other attributes that are different from those of one or more other cameras 240b. For example, the cameras 240b on the right and left sides of the vehicle may have an angle of view that is greater than the angle of view associated with the cameras 240b positioned at the front left, front right, rear left, or rear right of the vehicle. In some embodiments, the angle of view of the cameras 240b are chosen so that the field of view of different cameras 240b overlap, at least in part, to ensure camera coverage at particular locations or orientations relative to the vehicle 200.

The lidar devices 240c are also disposed at different locations of the vehicle 200, and in one embodiment, are disposed symmetrically about the longitudinal axis of the vehicle 200 to achieve parallax. Each of the lidar devices 240c may include or incorporate one or more lasers, scanning components, optical arrangements, photodetectors, and other components suitably configured to horizontally and rotatably scan the environment in the vicinity of the vehicle 200 with a particular angular frequency or rotational velocity. For example, in one embodiment, each lidar device 240c is configured to horizontally rotate and scan 360° at a frequency of 10 Hertz (Hz). As used herein, a lidar scan should be understood as referring to a single revolution of a lidar device 240c.

In exemplary embodiments described herein, the frequency or rate at which the cameras 240b capture images is greater than the angular frequency of the lidar devices 240c. For example, in one embodiment, the cameras 240b capture new image data corresponding to their respective field of view at a rate of 30 Hz. Thus, each camera 240b may capture multiple images per lidar scan, and capture the images at different times independent of the orientation of the lidar device 240c or the angular position within the scan.

The autonomous vehicle uses the information from these different types of sensors to track the three-dimensional location and geometry of objects in the vicinity of the vehicle. In one exemplary embodiment, the tracking system of the autonomous vehicle can generate or use such information for identifying three-dimensional locations of objects, distance/depth of the object from the vehicle, dimensions and shapes of the objects, velocity of the objects, etc. As an illustration, the tracking system uses lidar for determining the location and orientation of the car.

FIG. 6 illustrates utilization of such sensor information for analyzing traffic signal lights. Process block 300 is performed offline and includes surveying the traffic signal lights as each city is mapped in three dimensions (3D). In one exemplary embodiment, sensor information about the traffic signal lights can be obtained by fixing the camera aperture and surveying traffic signal lights in 3D and fusing the results across linked traffic signal lights. In this manner, process block 300 obtains the 3D position and 3D orientation of the traffic signal lights.

Process block 302 is also performed offline and places the traffic signal lights in point clouds in order to obtain the point cloud information around them. The placement of the traffic lights in the point clouds reduces the computational overhead and filters out false positives. For example, if an autonomous vehicle knows its position in the driving environment and it knows the position of the traffic signal light in the driving environment, it can know where in the image to expect the traffic signal light as well as how far away it is. In this example, the lidar data for the point clouds had been accumulated from a vehicle mapping drive to find the traffic lights offline. The data is accumulated from multiple scans as the mapping vehicle drives through the intersection and provides points on a traffic light to identify it in the accumulated point cloud.

Within the generated point clouds, process block 304 places for an autonomous vehicle during operation the traffic signal lights so that the probable geometries and positions for traffic signal lights can be obtained. This identifies windows where traffic signal lights are probably located. Within that window, process block 306 runs one or more neural networks to determine whether it is a traffic signal light as well as characteristics about the traffic signal light. Semantic information, such as lane information from a route database, can further help resolve characteristics about the traffic signal light.

Figure 7:
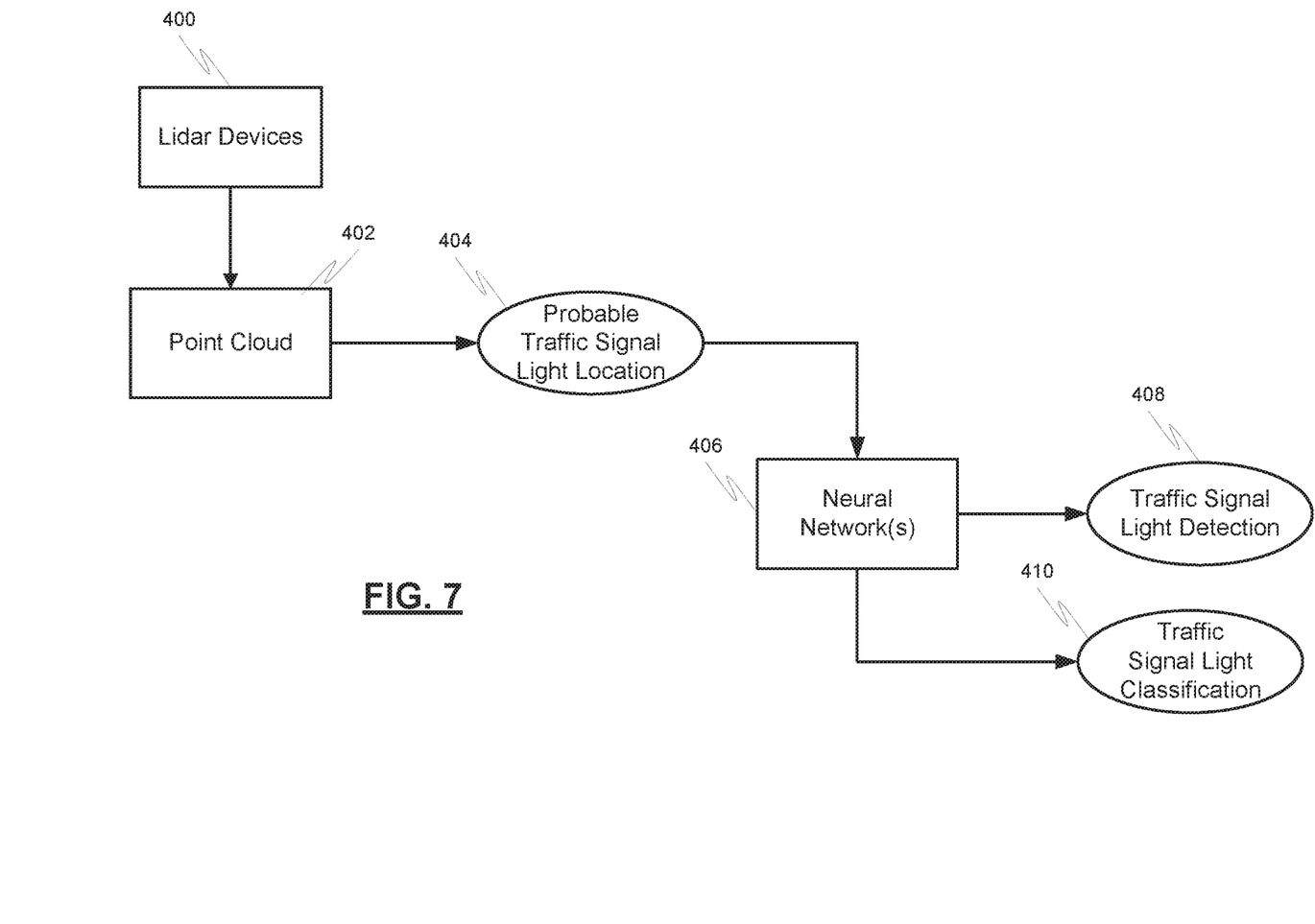
FIGS. 7-9 are functional block diagrams depicting use of neural network(s) for traffic signal light processing, in accordance with various embodiments.

FIG. 7 illustrates using one or more neural networks 406 for traffic signal light detection 408 and classification 410. To provide the data needed for the neural networks 406, data from lidar devices 400 is persisted in a point cloud 402. For the point cloud 402, the lidar data was accumulated from a vehicle mapping drive to locate the traffic lights offline.

For generation of the point cloud 402 in this example, lidar devices 400 perform a scan by illuminating a target, such as a traffic signal light, with pulses of laser light, and measure distance to a target by receiving reflected pulses back. The intensity of the reflected pulses can be collectively used by the lidar devices 400 to generate a lidar point cloud that represents the spatial structure/characteristics of objects, such as traffic signal lights, within the field of view. In one embodiment, the lidar devices 400 use rotating laser beams that rotate to scan three-hundred and sixty (360) degrees around the vehicle. In another embodiment, the lidar devices 400 oscillate back and forth at a certain scan frequency (i.e., how fast they oscillate). The rate at which the lidar devices 400 pulse in KHz can be referred to as a repetition rate. For example, if the pulse rate is 100 KHz, then the laser will pulse 100,000 times a second and will receive information back from the pulses in this time.

Each of the lidar devices 400 receive lidar data and process the lidar data (e.g., packets of lidar return information) to generate a lidar point cloud. Each point cloud is a three-dimensional set of points in a three-hundred and sixty (360) degree zone around the vehicle. Each point has intensity data in addition to a three-dimensional XYZ location. In one embodiment, the point cloud includes a first, intermediate and last returned from each laser pulse. In one embodiment, two lidar devices are utilized and are synchronized together (or phase-locked).

In addition, it is noted that in one embodiment, the cameras are run at their maximum frame rate. The refresh rate of the cameras is much higher than the lidar devices 400. As lidar spins clockwise from the back of the car, each camera captures images in a clockwise order during the lidar device's rotation. An extrinsic calibration procedure provides information regarding where the cameras are pointing. The lidar devices 400 are phase locked (i.e., scheduled to be in a certain rotational positions at certain times) so it is known when the lidar devices 400 scan certain parts of their cycle. For analysis of a scene, the system can determine which imager/camera is aligned at a point in time when certain lidar data was acquired. The system can the select whatever image was sampled/obtained closest to the point in time during which the lidar data was acquired such that only images that were captured near a certain target time (i.e., when the lidar device is looking at the same region that a camera is pointing) will be processed. As a result, camera-lidar pairs with excellent alignment can be determined. This gives lidar data at a certain heading/orientation along with corresponding image data for the scene/environment at that heading/orientation.

The lidar data of the two lidar point clouds acquired by the two lidar devices 400 are fused together into a single lidar point cloud. Three-dimensional point sampling is performed in order to pre-process the lidar data (of the single lidar point cloud) to generate a set of three-dimensional points that represent the external surface of an object.

During operation of an autonomous vehicle, the probable location 404 of a traffic light (which is a set of points in the point cloud 402) is provided to the neural network(s) 406. The neural network(s) 406 use this information to determine whether the object identified within the probable location 404 is a traffic signal light. The neural network(s) 406 also classify the traffic signal light based on shape, color, or other characteristics. As an illustration, the classification of the traffic signal light can include identifying which of the many different types of traffic signal lights it may be, such as a traffic signal light with a left turn signal, railroad crossing traffic light, etc.

Figure 8:
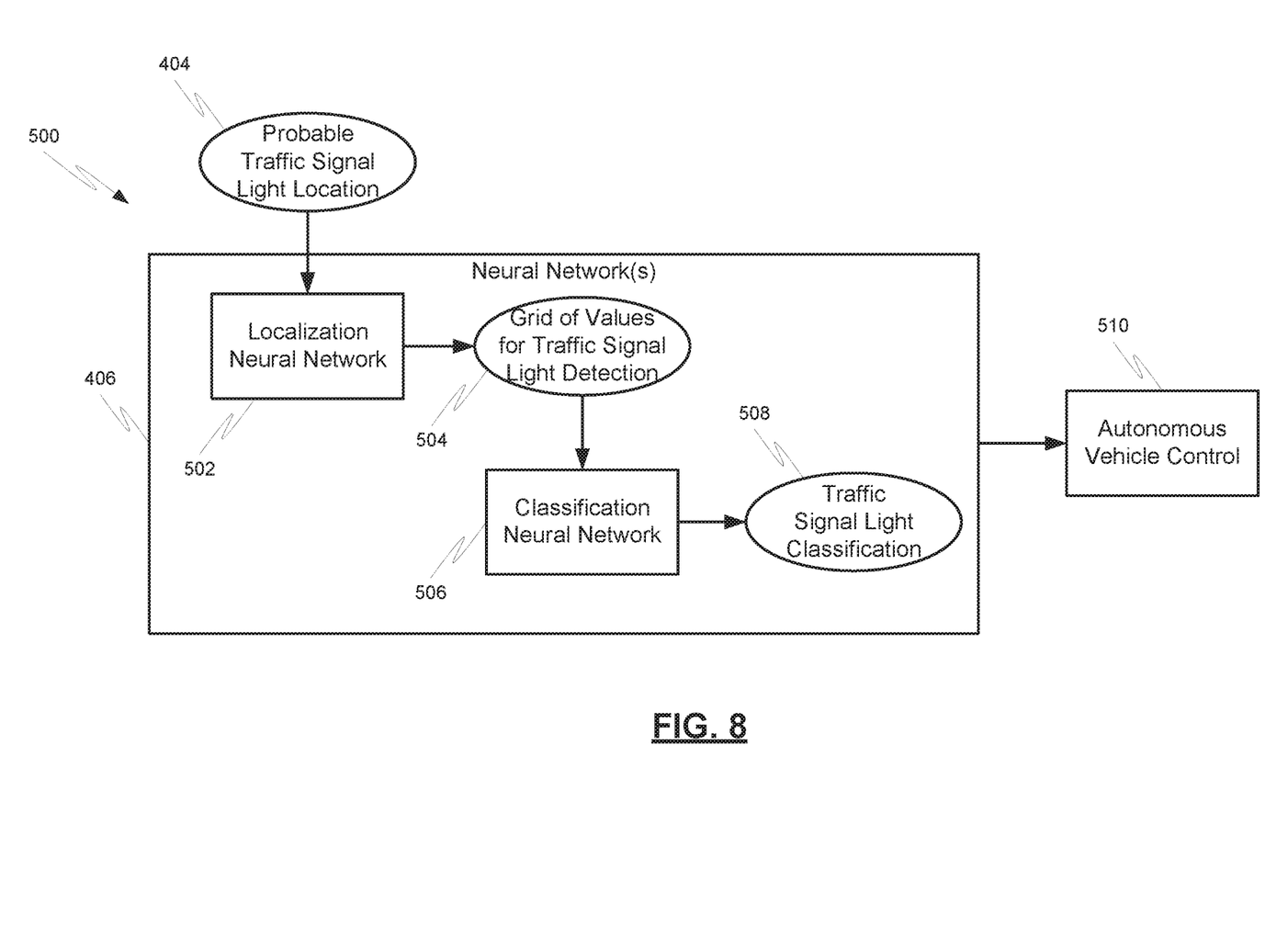

FIG. 8 depicts at 500 the use of two neural networks, where a first neural network 502 locates candidates for traffic lights in a camera image, and a second neural network 506 classifies their shape and color given a candidate.

In this operational scenario, a window is generated within a camera image for the traffic lights as probable traffic signal light location 404 and is used with the neural networks 502 and 506. The window is considered a region of interest (ROI), which is placed around the traffic light. In this operational scenario, the ROI is a rectangle that measures 2 meters wide and 4 meters tall around the traffic light.

The rectangle is then projected into the camera image, so its pixel size in the image grows larger as the vehicle gets closer. The ROI is then scaled to a fixed pixel size (e.g., 160×320, etc.). Because the metric size is fixed, the traffic signal lights have the same size in that scaled image, no matter how far away the vehicle is.

All traffic signal lights are scaled to be the same size so that a single detector can be trained at a single scale, instead of having to train a single detector at multiple scales or multiple detectors at a single scale. The scaled ROI is then used in two steps of this operational scenario. In the first step, a neural network outputs a grid of values (instead of a single value), which is referred to as a localization neural network 502. The localization neural network 502 outputs a confidence indication for every grid cell or for groups of adjacent grid cells, indicating how likely it is that this cell or group of cells contains a traffic signal light. After this step, the local maxima in the resulting response map are determined and used as candidate locations for traffic signal lights.

In the second step, a 48×48 pixel window is imposed around every candidate location and is input into the second neural net 506, the classification neural network. The output of the classification of network is a vector of responses with probabilities for every state. For example, an output from the classification of network 506 can include: (p_red_circle, p_yellow_circle, . . . , p_red_left_arrow, p_red_right_arrow, . . . ).

The classification neural network 506 can determine the instantaneous traffic signal light state (e.g., red, yellow, green) and derivate states such as red or yellow blinking in the following manner. A flashing light can be detected by storing the detections over a sliding window of time and performing time series analysis. In one embodiment, a Fourier transform can be used, and if the signal for the Fourier transform is confident enough, the signal is suppressed for the respective color and replaced with a fixed confidence value for a flashing light of the same color.

The traffic signal light location and classification data from the neural networks 502 and 506 can be used for many different purposes, such as for autonomous vehicle control 510. As an illustration, the identified traffic signal light behavior improves tracking of the other vehicles that are in proximity to the autonomous vehicle and helps determine whether they are expected to be stationary or moving based upon the analyzed traffic signal lights.

It should be understood that the system of FIG. 8 can be configured in many different ways. For example, the system can be trained such that every ROI in an image is classified by the classification neural network 506, and each classification produces a confidence vector that is treated as a vector of probabilities with (p_red, p_yellow, etc.), with the magnitude of that vector being 1. In such a situation, if only one of the values is high and the others are low, then these vectors can be combined in a probabilistic voting scheme that allows the contradictions to be handled, provided the majority agrees.

Still further, traffic signal light data from other vehicles within the driving environment can be used to form a holistic view of the traffic lights. This data from other vehicles could be used within the voting scheme. Additionally, the holistic view of the traffic signal lights could also be used for routing and fleet optimization, such as when traffic is backed up on a light with a short interval, the fleet can be rerouted to avoid this intersection.

Figure 9:
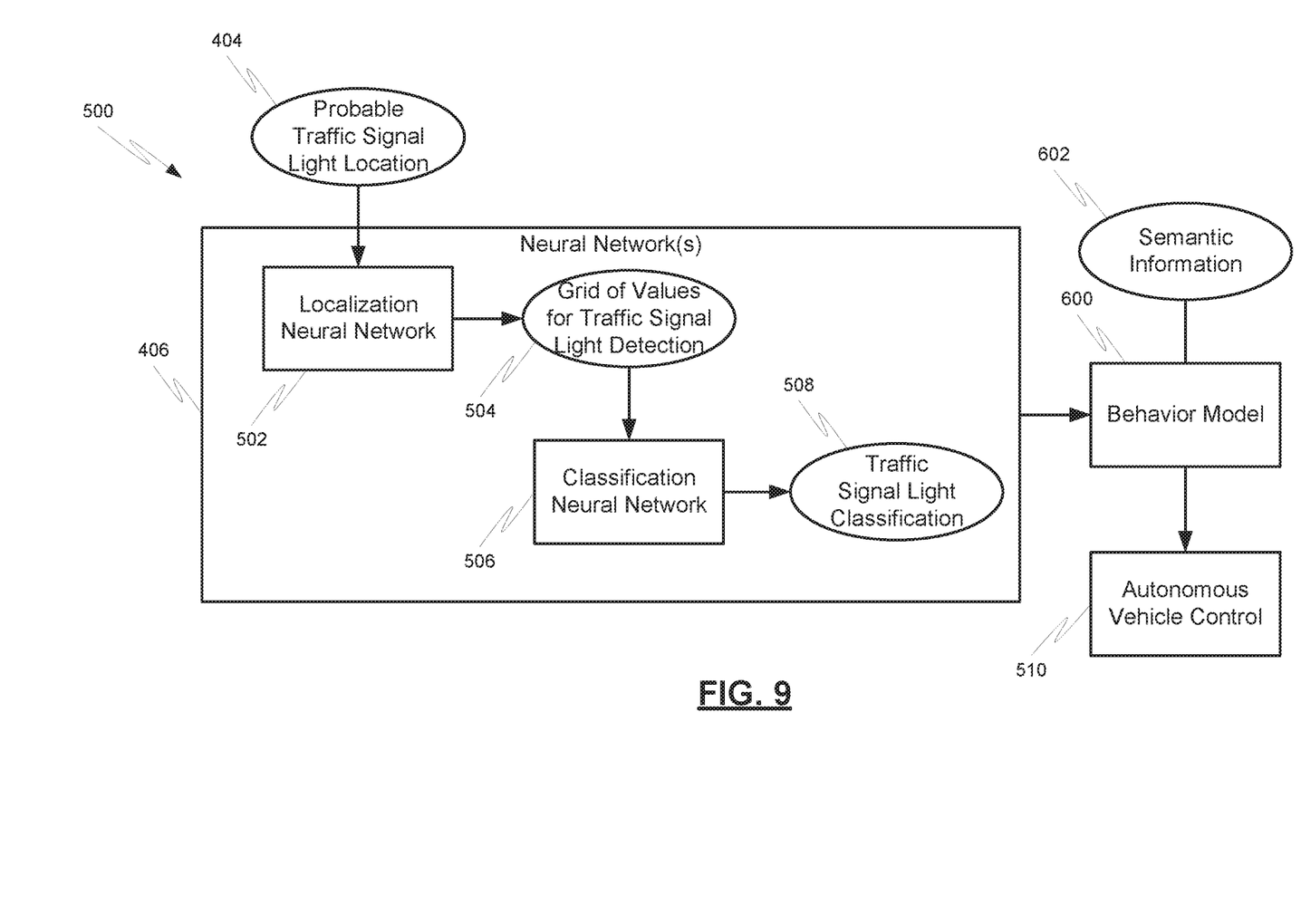

FIG. 9 provides another example of how outputs from the neural networks 502 and 506 can be used. A behavior model 600 can be used to abstract away from the output of the classification neural network 506. While the classification neural network 506 outputs shape, color, and other characteristics, the behavior model 600 can extract semantic information 602. For example, an incoming traffic signal can be split into information intended for going left, straight, or right. The information is then fused from linked lights of different types located within the driving environment. For instance, if there is a green circle, it indicates it is legal to go straight in all directions. A left green arrow only contains a signal for going left. Without this level of abstraction, the green circle and green arrow would contradict each other. With this level of abstraction, confidence is increased within the behavior when determining to go left for the autonomous vehicle, while the confidence for going straight and right is not lowered.

Another example of fusing information from different traffic lights involves an autonomous vehicle approaching an intersection with multiple linked traffic lights that control the intersection. By determining which traffic lights are associated with a particular lane, traffic signal light information from the neural networks(s) 502 and 506 can be fused together to obtain a better idea of the actual state of a traffic signal light, especially if one or more the traffic signal lights are obstructed or occluded. To assist in fusing traffic signal light information, a deep learning neural network (DLNN) can be trained to track and build a behavior model based on the different types of traffic signal lights, such as the more than fifty official traffic lights tracked by the Department of Transportation (DOT).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

As an illustration of the broad scope of the systems and methods described herein, a convolutional neural network can be used for classification of the traffic signal lights. The convolutional neural network is applied to image data from the camera(s) of an autonomous vehicle where the image data provides depictions of the vehicle driving environment. The convolutional neural network contains layers of filters that successively identify traffic signal light features from the input camera images. As an example, a left turn arrow on a traffic signal light may be a feature that is detected and learned by the layers of the convolutional neural network for traffic signal light classification.

As yet another illustration of the broad scope of the systems and methods described herein, different types of machine learning models can be used. For example, these may include Support Vector Machines (SVMs), random forests, etc. Such machine learning models can be configured to automatically build traffic signal light classifiers by learning the characteristics of the categories from a set of classified data. A machine learning model then can use the classifier to classify input data, such as vehicle environment data from sensors, into predefined categories, such as traffic signal light classifications. Different types of machine learning models can be used separately or together in order to improve the robustness of the traffic signal light classification process.

What is claimed is:

1. A method for analyzing traffic signal lights in order to control an autonomous vehicle, comprising:
    receiving, by one or more processors, an image from a camera regarding at least one traffic signal light located within the driving environment of the autonomous vehicle;
    receiving, by the one or more processors, data related to probable geometry and position of the traffic signal light located within the image; and
    applying a machine learning model that includes neural networks, using the one or more processors, to the received data and to the camera image for determining location and characteristics of the traffic signal light, wherein the determined characteristics include characterization of the traffic signal light with respect to shape and color;
    wherein two separate of the neural networks are a localization neural network and a classification neural network to analyze the probable geometry and position of the traffic signal light; wherein the two separate of the neural networks include the localization neural network operating prior to the classification network and providing input to the classification neural network;
    wherein control of the autonomous vehicle is based upon the determined location and characteristics of the traffic signal light by the neural networks.

2. The method of claim 1, wherein the camera image is from a fixed exposure camera.

3. The method of claim 1, wherein locating the one or more traffic signal lights by using the neural networks results in filtering out false positives.

4. The method of claim 1, wherein the localization neural network determines the location of the traffic signal light; wherein the classification neural network determines one or more characteristics associated with the traffic signal light, wherein the characteristics include color and shape.

5. The method of claim 4, wherein state of the traffic signal light is determined based upon the determined characteristics of the traffic signal light by the classification neural network, wherein the state of the traffic signal light includes determining whether the traffic signal light is indicating a left or right turn.

6. The method of claim 4, wherein a plurality of traffic signal lights is surveyed to generate three-dimensional position data and three-dimensional orientation data of the surveyed traffic signal lights within a points cloud;
    wherein the points cloud is used to determine position of the autonomous vehicle with respect to the traffic signal light located within the driving environment and to generate a window where the traffic signal light within the driving environment is expected to be located by the neural networks.

7. The method of claim 4,
wherein region of interest windows are projected around a plurality of traffic signal lights in the camera image where their pixel sizes in the image grows larger as the autonomous vehicle get closer;
wherein the region of interest windows are then scaled to a fixed pixel size to provide that the plurality of traffic signal lights in the camera image has the same size in the scaled camera image irrespective of how far away the autonomous vehicle is, thereby allowing a single detector to be trained at a single scale.

8. The method of claim 7, wherein the localization neural network outputs a grid of values with respect to the window;
wherein the grid of values provides a confidence indication for each grid cell or for groups of adjacent grid cells indicating how likely each of the grid cells or the groups contain a traffic signal light.

9. The method of claim 8, wherein the grid cells or the groups of adjacent grid cells with confidence indications that satisfy a pre-selected criteria are used by the classification neural network as candidate locations;
wherein the classification neural network outputs a vector of responses with probabilities for different traffic signal light states.

10. The method of claim 1, wherein semantic information and state information about linked traffic signal lights and the driving environment are used in determining state of the traffic signal light.

11. A system for analyzing traffic signal lights in order to control an autonomous vehicle, the system comprising:
a computer-readable storage device for storing instructions for performing traffic signal analysis for autonomous vehicle operations; and
one or more data processors configured to execute the instructions to:
receive an image from a camera regarding at least one traffic signal light located within the driving environment of the autonomous vehicle;
receive data related to probable geometry and position of the traffic signal light located within the image; and
apply a machine learning model that includes neural networks to the received data and to the camera image for determining location and characteristics of the traffic signal light, wherein the determined characteristics include characterization of the traffic signal light with respect to shape and color;
wherein two separate of the neural networks are a localization neural network and a classification neural network to analyze the probable geometry and position of the traffic signal light; wherein the two separate of the neural networks include the localization neural network operating prior to the classification network and providing input to the classification neural network;
wherein control of the autonomous vehicle is based upon the determined location and characteristics of the traffic signal light by the neural networks.

12. The system of claim 11, wherein the camera image is from a fixed exposure camera.

13. The system of claim 11, wherein locating the one or more traffic signal lights by using the neural networks results in filtering out false positives.

14. The system of claim 11, wherein the localization neural network determines the location of the traffic signal light;
wherein the classification neural network determines one or more characteristics associated with the traffic signal light, wherein the characteristics include color and shape.

15. The system of claim 14, wherein state of the traffic signal light is determined based upon the determined characteristics of the traffic signal light by the classification neural network, wherein the state of the traffic signal light includes determining whether the traffic signal light is indicating a left or right turn.

16. The system of claim 14, wherein a plurality of traffic signal lights is surveyed to generate three-dimensional position data and three-dimensional orientation data of the surveyed traffic signal lights within a points cloud;
wherein the points cloud is used to determine position of the autonomous vehicle with respect to the traffic signal light located within the driving environment and to generate a window where the traffic signal light within the driving environment is expected to be located by the neural networks.

17. The system of claim 14,
wherein region of interest windows are projected around a plurality of traffic signal lights in the camera image where their pixel sizes in the image grows larger as the autonomous vehicle get closer;
wherein the region of interest windows are then scaled to a fixed pixel size to provide that the plurality of traffic signal lights in the camera image has the same size in the scaled camera image irrespective of how far away the autonomous vehicle is, thereby allowing a single detector to be trained at a single scale.

18. The system of claim 17, wherein the localization neural network outputs a grid of values with respect to the window;
wherein the grid of values provides a confidence indication for each grid cell or for groups of adjacent grid cells indicating how likely each of the grid cells or the groups contain a traffic signal light;
wherein the grid cells or the groups of adjacent grid cells with confidence indications that satisfy a pre-selected criteria are used by the classification neural network as candidate locations;
wherein the classification neural network outputs a vector of responses with probabilities for different traffic signal light states.

19. The system of claim 11, wherein semantic information and state information about linked traffic signal lights and the driving environment are used in determining state of the traffic signal light.

20. An autonomous vehicle comprising:
at least a camera and lidar sensor that provides sensor data; and
a controller that, by a processor and based on the sensor data, performs:
receive an image from a camera regarding at least one traffic signal light located within the driving environment of the autonomous vehicle;
receive data related to probable geometry and position of the traffic signal light located within the image; and
apply a machine learning model that includes more neural networks to the received data and to the camera image for determining location and characteristics of the traffic signal light, wherein the determined characteristics include characterization of the traffic signal light with respect to shape and color;

wherein two separate of the neural networks are a localization neural network and a classification neural network to analyze the probable geometry and position of the traffic signal light; wherein the two separate of the neural networks include the localization neural network operating prior to the classification network and providing input to the classification neural network;

wherein control of the autonomous vehicle is based upon the determined location and characteristics of the traffic signal light by the neural networks.

* * * * *